US006627688B1

(12) United States Patent
Takeda

(10) Patent No.: US 6,627,688 B1
(45) Date of Patent: Sep. 30, 2003

(54) ADHESIVE COMPOSITIONS AND ADHESIVE SHEETS

(75) Inventor: Yasuyuki Takeda, Yamagata (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/830,903

(22) PCT Filed: Dec. 9, 1999

(86) PCT No.: PCT/US99/29198

§ 371 (c)(1),
(2), (4) Date: May 2, 2001

(87) PCT Pub. No.: WO00/34405

PCT Pub. Date: Jun. 15, 2000

(30) Foreign Application Priority Data

Dec. 10, 1998 (JP) ............................................. 10-351113

(51) Int. Cl.$^7$ ................................................. C08K 5/09
(52) U.S. Cl. .................... 524/287; 428/425.8; 428/458; 428/461; 428/462; 428/463; 524/288
(58) Field of Search ................................ 524/287, 288; 428/425.8, 458, 461, 462, 463

(56) References Cited

U.S. PATENT DOCUMENTS 5,130,461 A    7/1992  Shinohara et al. .......... 556/449
5,164,245 A   11/1992  Suzuki ........................ 428/201

FOREIGN PATENT DOCUMENTS

| | | |
|---|---|---|
| EP | 0 656 369 | 11/1991 |
| EP | 0 459 720 | 12/1991 |
| EP | 0 581 532 | 2/1994 |
| EP | 0 735 122 | 2/1996 |
| JP | 01-174584 | 7/1989 |
| JP | 01-256582 | 10/1989 |
| JP | 04-35938 | 2/1992 |
| JP | 4-41493 | 2/1992 |
| JP | 05-97868 | 4/1993 |
| JP | 07-82626 | 3/1995 |
| JP | 07-197342 | 8/1995 |
| JP | 2 602 888 | 4/1997 |

*Primary Examiner*—Edward J. Cain
(74) *Attorney, Agent, or Firm*—Carolyn V. Peters

(57) ABSTRACT

The adhesive composition comprises a hydroxyl group-containing adhesive polymer having little or no carboxylic groups in the molecule, and a separate compound that is an aromatic carboxylic acid compound. This composition prevents the corrosion of a metal layer without requiring formation of a protective film in the production of an adhesive sheet comprising a metal layer.

10 Claims, No Drawings

US 6,627,688 B1

ADHESIVE COMPOSITIONS AND ADHESIVE SHEETS

FIELD OF THE INVENTION

The present invention relates to an adhesive composition used in articles comprising a metal layer for a predetermined purpose, such as adhesive sheets and optical disks. More particularly, it relates to an adhesive composition capable of effectively preventing the corrosion of a metal layer even when using in close contact with the metal layer. The present invention also relates to a decorative adhesive sheet having the appearance with metallic luster, wherein a metal layer contained therein can be seen through a light transmitting substrate and, more particularly, to an adhesive sheet which can prevent damage and loss of the metal layer due to the corrosion and maintain the appearance of a metal luster for a long period of time. The term "adhesive sheet" used in the specification of the present application includes decorative sheet, marking film (e.g. label, sticker, stripe tape, etc.), adhesive film, adhesive sheet and adhesive tape.

BACKGROUND OF THE INVENTION

Adhesive sheets have previously been known comprising a light transmitting substrate and a metal layer provided on the back surface of the substrate, which has the appearance with metallic luster and is useful as a decorative sheet, wherein the metal layer can be seen through the light transmitting substrate. Such an adhesive sheet usually comprises a light transmitting substrate, a metal layer made of a metal thin film layer provided on the back surface of the substrate, and an adhesive layer provided on the back surface of the metal layer, wherein the adhesive sheet is applied to an adherend via the adhesive layer. By the presence of the metal layer, the appearance of metal luster can be easily afforded to the adherend. The metal thin film layer constituting the metal layer is usually formed by a thin film forming means such as a deposition device or a sputtering device.

For example, Japanese Unexamined Patent Publication (Kokai) No. 1-174584 discloses an adhesive sheet comprising a substrate made of a laminated film consisting of a vinyl fluoride resin layer and a coated layer having excellent printability, and a metal deposited layer provided in close contact with the side of the fluoride vinyl resin layer. In the case of this adhesive sheet, when the vinyl fluoride resin having high heat resistance and good adhesion with the metal layer is used as a bonding layer between the substrate and metal layer, thereby to bond the substrate with the metal layer, fogging of the metal layer as described above can be prevented. In this publication, a vinyl chloride resin is listed as one example of the resin of the coated layer. However, the publication does not specifically disclose how the vinyl chloride resin is bonded with the vinyl fluoride vinyl resin. Furthermore, Japanese Unexamined Patent Publication (Kokai) No. 4-35938 discloses a decorative sheet using a multi-layer film comprising a layer of a polymer alloy of polyvinylidene fluoride (PVdF) and polymethyl methacrylate (PMMA) as a substrate. That is, in the case of this decorative sheet, an outermost layer is a first alloy layer enriched with PMMA and a layer provided in close contact with a metal layer is a second alloy layer enriched with PVdF. Since the first alloy layer has comparatively good adhesion with a comparatively soft resin such as vinyl chloride resin, the above substrate can be used as the bonding layer and the vinyl chloride film is used as the outermost layer of the substrate.

Since the adhesive layer of the adhesive sheet usually contains an acrylic adhesive layer, the adhesive sheet can be easily applied to the adherend by a pressing operation in the same manner as that in the case of a normal adhesive sheet. The acrylic adhesive polymer usually comprises a unit derived from an alkyl acrylate such as isooctyl acrylate, and a unit derived from a monomer containing a carboxylic group in the molecule, such as acrylic acid.

To prevent the corrosion of the metal thin film layer, a protective layer made of a specific metal oxide is directly provided on the metal thin film layer. For example, Japanese Unexamined Patent Publication (Kokai) No. 7-197342 teaches that a thin film made of zinc oxide or tin oxide is formed as a protective layer by a deposition method. Japanese Unexamined Patent Publication (Kokai) No. 7-82626 teaches that a thin film made of yttrium oxide is formed as a protective layer by an electron beam heating method.

On the other hand, an adhesive sheet using an adhesive composition comprising an adhesive polymer, which does not substantially have a carboxylic group in the molecule and has a hydroxyl group in the molecule, and an aromatic compound is also known. For example, Japanese Patent No. 2602888 discloses an adhesive sheet comprising a substrate and an adhesive layer provided on the back surface of the substrate, characterized in that said adhesive layer is obtained by adding a heavy metal deactivator (B) and a crosslinking agent (C) to an acrylic copolymer (A) containing (a) 1–20% by weight of a hydroxyalkyl acrylate or a hydroxyalkyl methacrylate and (b) 80–90% by weight of one or more alkyl acrylates as a monomer component. A general acrylic adhesive had a problem that, when applying to a substrate made of stainless steel or iron free from a surface treatment, the acrylic adhesive reacts with the metal of the substrate by ultraviolet ray and is decomposed and deteriorated, resulting in shrinkage, floating and peeling of the film. To the contrary, in the case of the adhesive sheet, decomposition and deterioration of the adhesive by ultraviolet ray do not occur and peeling of the film does not occur. As the heavy metal deactivator (B), there can be used an aromatic compound which is liable to incorporate a metal ion to form a complex compound. Particularly preferred are those which have a hydroxyl group and a carbonyl group at the ortho-position of the benzene ring and have this carbonyl group and a NH group of triazole at the α- and β-positions, such as disalicyloylhydrizide decamethylenecarboxylate and 3-(N-salicyloyl) amino-1, 2, 4-triazole.

However, as described above, when the protective film is provided to prevent the corrosion of the metal layer, particularly loss of the metal thin film layer, a comparatively complicated protective film forming step must be introduced in the production step and, therefore, the production of the adhesive sheet becomes complicated.

On the other hand, as described in the above patent publications, difficulties in the production as described above can be overcome if the formation of the protective film can be omitted by using the adhesive sheet formed by using a specific adhesive. However, the above publications do not specifically disclose the adhesive composition (particularly chemical structure and content of the aromatic compound) which effectively prevents the corrosion of the metal layer and is effective to prevent loss of the metal layer when the adhesive sheet is used for a long period of time.

SUMMARY OF THE INVENTION

An adhesive composition comprising i) a hydroxyl group-containing adhesive polymer, and ii) an aromatic carboxylic acid compound, wherein said polymer comprises a sufficiently low amount of monomer units containing a carboxylic group that the adhesive composition is Corrosion Resistant.

For purposes of the present invention o an adhesive composition is considered to be Corrosion Resistant if a laminate of the adhesive on a galvanized iron plate (substrate), when dipped in a sodium chloride solution having a concentration of 5% by weight at a normal temperature (about 25° C.) for 15 days does not exhibit corrosion up on ordinary visual inspection.

DETAILED DESCRIPTION OF THE INVENTION

It has been found as a result of the present inventors study that the adhesive polymer containing deleterious amount of a unit derived from a monomer containing a carboxylic group in the molecule corrodes the metal thin film layer adjacent to the adhesive layer when the adhesive sheet is used for a long period of time. The corrosion of the metal thin film layer causes loss and whitening of the metal thin film layer in the adhesive sheet as described above, resulting in deterioration of the appearance of the adhesive sheet. For example, almost all of the metal layer, which should be seen through the light transmitting substrate after dipping the above adhesive sheet (the adhesive layer contain an adhesive polymer having a carboxylic group) in a sodium chloride solution having a concentration of 5% by weight, is lost. Furthermore, even if only an adhesive polymer that does not substantially have a carboxylic group in the molecule, is used in the adhesive layer, the corrosion of the metal layer as described above could not be prevented.

The present invention is to provide an adhesive composition capable of effectively inhibiting the corrosion of a metal layer without requiring formation of a protective sheet in the production of an adhesive sheet comprising a metal layer.

In another aspect, the present invention provides an adhesive sheet comprising a substrate, a metal layer provided on one principal surface of said substrate, and an adhesive layer provided in closely contact with said metal layer, characterized in that said adhesive layer is made of the adhesive composition above.

The adhesive composition of the present invention contains, as an essential component, (i) an adhesive polymer having little or no carboxylic group (carboxyl group:—COOH) in the molecule and has a hydroxyl group (—OH) in the molecule (hereinafter also referred to as a "hydroxyl group-containing polymer") and (ii) an aromatic carboxylic acid compound having a carboxylic group in the molecule (hereinafter also referred to as an "aromatic carboxylic acid"). By the presence of these two essential components, corrosion of the metal layer constituting the adhesive sheet can be effectively inhibited and loss of the metal layer, particularly metal thin film layer, with a lapse of time can be effectively prevented. It is unnecessary to introduce a comparatively complicated protective film forming step in the production step. Accordingly, the production of the adhesive sheet can be carried out in the same manner as that in the case of a normal adhesive sheet.

While not being bound by theory, it is believed that a mechanism for the inhibition of the corrosion of the metal layer in the present invention lies in the following point. First, it is believed that the aromatic carboxylic acid chemically reacts with the surface of the metal layer to naturally form a kind of a protective film, thereby effectively inhibiting the corrosion of the metal layer. Such a corrosion inhibition effect requires the presence of a carboxylic group conjugated with a double bond. In the case of the aromatic carboxylic acid, the carboxylic group and benzene ring are conjugated. On the other hand, the adhesive polymer, which functions as an adhesive component in the adhesive composition (or adhesive layer made of the adhesive composition), does not substantially have a carboxylic group in the molecule. It is believed that a hydroxyl group contained in the molecule assists the corrosion inhibition effect of the aromatic carboxylic acid.

While not being bound by theory, it is believed that the aromatic carboxylic acid is adsorbed on the metal surface to form a stable molecular film at the adhesion interface with the adhesive composition. When such an interfacial molecular film is present in a stable state, it is possible to effectively prevent water from acting on the surface of the metal layer, thereby making it possible to inhibit the corrosion. It is believed that the stability of such an interfacial molecular film is enhanced as the affinity of the adhesive polymer contained in the adhesive composition to the aromatic carboxylic acid is lower. That is, when a polymer having high affinity to the aromatic carboxylic acid is present in the composition, the ability to incorporate the aromatic carboxylic acid into the composition (or adhesive layer) and compatibilizing it increases. It is believed that a polymer, that is substantially free of carboxylic groups in the molecule (including a so-called "carbon-free" polymer which does not have any carboxylic group) has an affinity to the aromatic carboxylic acid, which is lower than that of a polymer having a carboxylic group in the molecule and, therefore, the effect of stabilizing the interfacial molecular film is high. The adhesive polymer is preferably free from carboxylic acid. However, an adhesive polymer having a trace amount of a carboxylic group can also be used as far as the effect of the present invention is not adversely affected. When the carboxylic group is contained in the molecule, a weight ratio of a carboxylic unit (monomer unit containing a carboxylic group) to the whole polymer should be adjusted usually smaller than 10% by weight, preferably not more than 5% by weight, and more preferably not more than 2% by weight.

On the other hand, it is also important for exerting the above corrosion inhibition effect that the adhesive polymer has a hydroxyl group in the molecule, that is, an adhesive hydroxyl group-containing polymer is used. Although the action of such a hydroxyl group is well understood, it is believed that the hydroxyl group acts on the benzene ring of the aromatic carboxylic acid, thereby to enhance the stability of the interfacial molecular film. The proportion (weight ratio) the monomer unit having a hydroxyl group based on the whole polymer is not less than 1% by weight, and preferably not less than 5% by weight.

The adhesive polymer is not specifically limited as far as the effect of the present invention is not adversely affected, but is preferably an acrylic polymer.

The aromatic carboxylic acid is not specifically limited as far as the effect of the present invention is not adversely affected, but is preferably benzoic acid or a derivative thereof. Salicylic acid (orthohydroxybenzoic acid) is particularly preferred, because the corrosion inhibition effect as described above is particularly high.

The adhesive composition of the present invention is particularly suited to form articles such as decorative sheet comprising a metal layer. That is, another aspect of the present invention provides an article comprising a light transmitting substrate, a metal layer provided on one principal surface of said substrate, and an adhesive layer provided in closely contact with said metal layer, characterized in that said adhesive layer is made of the above adhesive composition. The light transmitting substrate can vary with the kind of the article, for example, a light transmitting polymer film (in case of the adhesive sheet) and a plastic substrate of an optical disk such as DVD can be used. The metal layer may be a metal deposited layer for forming a recording layer of an optical disk, including a layer for affording the metallic appearance to the decorative sheet and adhesive sheet. In the case of the optical disk, the adhesive layer made of the adhesive composition of the present invention can be used when the optical disk is completed by laminating a first plastic substrate supporting the above recording layer with a second plastic substrate (which may be one supporting a metal deposited layer) with facing the above recording layer inside.

When the adhesive sheet is formed, the above substrate preferably comprises a moistureproof film. Consequently, it is possible to prevent water from penetrating the metal surface from the outside, thereby making it possible to prevent corrosion of the metal layer, more effectively. The moistureproof film is, for example, a film containing a fluoropolymer.

The adhesive composition and adhesive sheet of the present invention will be described hereinafter with reference to their preferred embodiments hereinafter.

Adhesive Composition

As described above, the adhesive composition of the present invention contains, as an essential component, (i) an adhesive polymer which does not contain a deleterious amount of a carboxylic group in the molecule and has a hydroxyl group in the molecule and (ii) an aromatic carboxylic acid. The proportion of the adhesive polymer contained in the adhesive composition is not specifically limited as far as the effect of the present invention is not adversely affected, and is preferably not less than 50% by weight, and more preferably not less than 70% by weight, based on the whole adhesive composition.

The content of the aromatic carboxylic acid is preferably from about 0.1 to 25 parts by weight, more preferably from 0.5 to 20 parts by weight, and most preferably from 1 to 18 parts by weight, based on 100 parts by weight of the adhesive polymer. When the content of the aromatic carboxylic acid is too small, the corrosion inhibition effect is likely to be lowered. On the other hand, when the content is too large, the initial adhesive strength is likely to be lowered.

The adhesive composition of the present invention contains the adhesive polymer as the adhesive component and, therefore, it can be used in the same manner as that in the case of a normal adhesive. It can also be used as a hot-melt or thermally active type adhesive by adding a thermoplastic polymer to the adhesive composition.

The adhesive composition of the present invention preferably contains a curing agent, in addition to the above essential components. The curing agent can enhance a cohesive strength and water resistance of the composition (or adhesive layer). As the curing agent, for example, isocyanate compound, melamine compound, epoxy compound and poly(meth)acrylate can be used. The proportion of the curing agent is usually smaller than 30% by weight, preferably from 0.1 to 20% by weight, and particularly from 0.2 to 15% by weight, based on the whole adhesive composition. When the proportion of the curing agent is too small, there is a fear that the cohesive strength and water resistance of the adhesive layer can not be enhanced. On the other hand, when the proportion is too large, the adhesive strength is likely to be lowered.

The curing of the adhesive composition can be carried out before and/or after bonding with the adherend. When the adhesive layer is cured before bonding with the adherend by using the adhesive sheet made of the adhesive composition in the same manner as that in the case of a normal adhesive sheet, it is necessary to pay attention so as not to lose the adhesion property of the adhesive layer. In this case, the cured adhesive layer may form an adhesive layer by heating.

As far as the effect of the present invention is not adversely affected, conventionally known additives can be added to the adhesive composition. Suitable additives include, for example, viscosity adjustors, defoamers, leveling agents, ultraviolet absorbers, antioxidants, pigments, mildewproofing agents, inorganic particles such as glass beads, and elastic microspheres made of adhesive polymer or non-adhesive rubber polymer.

Adhesive Polymer

The adhesive polymer which does not contain a deleterious amounts of a carboxylic group in the molecule and has a hydroxyl group in the molecule (hereinafter also referred to as an "adhesive polymer") may be any polymer which exhibits the adhesion property at a normal temperature (about 25° C.) and has the above chemical structure, but is not specifically limited. Suitable adhesive polymer includes, for example, acrylic polymer, nitrile-butadiene copolymer, styrene-butadiene copolymer, polyurethane and silicone polymer. The adhesive polymer is composed of these polymers alone or in combination thereof.

The carboxylic acid-free polymer (i.e., polymer having no carboxylic group in the molecule) can be obtained by polymerizing a raw material containing little or no monomer having a carboxylic group in the molecule, such as acrylic acid. Alternatively, the carboxylic group in the molecule may be reacted to be converted into a functional group other than the carboxylic group after the completion of the polymerization.

One preferred example of the acrylic polymer, which can be used in the present invention, will be described hereinafter. As a starting monomer, a raw material containing (A) one or more alkyl acrylates and (B) a hydroxylalkyl (meth) acrylate can be prepared, for example, by copolymerizing according to a normal method such as emulsion polymerization, solution polymerization, bulk polymerization and suspension polymerization. The alkyl acrylate includes, for example, ethyl acrylate, n-butyl acrylate, isobutyl acrylate, n-pentyl acrylate, n-octyl acrylate, isooctyl acrylate, 2-ethylhexyl acrylate and lauryl acrylate. The hydroxyalkyl acrylate includes, for example, 2-hydroxyethyl acrylate, 2-hydroxypropyl acrylate and 2-hydroxymethyl acrylate. The hydroxyalkyl methacrylate includes, for example, 2-hydroxyethyl methacrylate and 2-hydroxypropyl methacrylate.

When the acrylic polymer is prepared by polymerizing a starting monomer containing, as an essential component, (A) an alkyl acrylate (one or more kinds) and (B) a hydroxyalkyl (meth)acrylate (one or more kinds), the proportion of the component (A) is usually from 80 to 99% by weight, and preferably from 85 to 95% by weight, whereas, the proportion of the component (B) is usually from 1 to 20% by weight, and preferably from 5 to 15% by weight. When the proportion of the hydroxyalkyl (meth)acrylate is too small, the cohesive strength is likely to be lowered. On the other hand, when the proportion is too large, the water resistance is likely to be lowered.

In addition to the above components (A) and (B), the other copolymerizable monomer such as alkyl methacrylate containing no hydroxy group can also be used in combination.

The molecular weight of the adhesive polymer may be within a range where a predetermined adhesive strength can be exhibited, and is usually within a range from 10,000 to 100,000 in terms of a weight-average molecular weight. As the adhesive polymer, any type such as solution type (polymer is contained in a solvent), emulsion type and suspension type (polymer is dispersed in a solvent) can be used alone or in combination thereof.

Similar to the adhesive of the prior art, a tackifier can also be used, together with the adhesive polymer. As far as the effect of the present invention is not adversely affected, the above adhesive polymer may be those which can be crosslinked by heat or radiation. The crosslinking of the adhesive polymer can be carried out before and/or after bonding with the adherend.

The adhesive polymer may also be formed by coating a raw material mixture containing a monomer affording an adhesive polymer after the polymerization and an aromatic carboxylic acid on the surface of a substrate or a metal layer, and polymerizing the raw material mixture. As a polymerization energy of the monomer, heat or radiation (e.g. ultraviolet ray, electron beam, etc.) can be used.

Aromatic Carboxylic Acid

The aromatic carboxylic acid compound (aromatic carboxylic acid) is a compound which has at least one benzene ring in the molecule and at least one carboxylic group conjugated with the benzene ring. It also includes those which are added as an aromatic carboxylic acid metal salt in the composition and are decomposed in use (in the state of being bonded with the adherend) to be converted into an aromatic carboxylic acid. The molecular weight of the aromatic carboxylic acid is not specifically limited, but is usually from 121 (molecular weight of benzoic acid) to 1,000.

Specific examples of the aromatic carboxylic acid compound include benzoic acid, and benzoic acid derivatives such as hydroxybenzoic acid (including salicylic acid), methylbenzoic acid, phthalic acid and aminobenzoic acid. Those obtained by polymerizing two or more monomers may also be used.

Method for Production of Adhesive Composition

The adhesive composition of the present invention can be prepared by uniformly mixing the respective raw materials according to a normal mixing operation. For example, a liquid adhesive composition can be prepared by mixing an adhesive polymer, an aromatic carboxylic acid, a solvent, and an additive to be optionally added, such as curing agent using a mixing device such as homomixer and planetary mixer, and uniformly dissolving or dispersing the respective materials.

A film-shaped adhesive made of an adhesive composition can also be formed by coating the liquid composition thus prepared on a substrate and drying it. The film-shaped adhesive can be used as the adhesive layer of the adhesive sheet described hereinafter. The coating may be formed by any appropriate method, such as knife coater, roll coater, die coater and bar coater methods.

The film-shaped adhesive may be formed on any releaseable substrate, such as a liner, substrate of the adhesive sheet, and adherend having a plated surface. When using those having releasability, such as liner, a film-shaped adhesive made of an adhesive composition can be obtained by isolation. For example, an adhesive sheet can be formed by preparing a film-shaped adhesive with liner and transferring the film-shaped adhesive onto the substrate.

Adhesive Sheet

The adhesive sheet of the present invention can be made, for example, in the following manner. The liquid adhesive composition prepared as described above is directly coated on one principal surface of a substrate or a metal layer to form an adhesive layer made of the dried adhesive composition. Alternatively, as described above, the liquid adhesive composition may be coated on a liner to form a film-like adhesive with the liner, followed by transferring the film-like adhesive on one principal surface of the substrate directly or on a metal layer on the principal surface thereof to form an adhesive layer. As a coating means, techniques such as those known in the art can be used. Drying is usually performed at a temperature within a range from 60 to 180° C. The drying time is usually from tens of seconds to several minutes. The thickness of the adhesive layer is usually from 10 to 100 $\mu$m. and preferably from 15 to 80 $\mu$m. When the thickness of the adhesive layer is too small, there is a fear that the initial adhesive strength is lowered and a reduction in adhesive strength with a lapse of time can not be prevented. On the other hand, when the thickness is too small, there is a fear that the flexibility and pliability of the whole adhesive sheet are lowered and it becomes difficult to perform an applying operation.

The substrate used in the adhesive sheet of the present invention is not specifically limited, but there can be used those which are conventionally used as a base film of the adhesive sheet of the prior art and have pliability. For example, paper, metallic film and plastic film can be used. As the plastic, for example, synthetic polymers such as polyvinyl chloride, acrylic polymer (e.g. polymethyl methacrylate, etc.), fluoropolymer (e.g. polyvinyl fluoride, polyvinylidene fluoride, etc.), polyester (e.g. PET, etc.) and polyurethane can be used.

The substrate may be those which are capable of transmitting visible light and ultraviolet ray, or colored or decorated by printing. Alternatively, the substrate may be those wherein a metal deposited film is provided to afford the appearance with metal gloss. It is also possible to use, as the substrate, a polarizing film, a dielectric reflective film, a retroreflective film, a prism film, a fluorescent film and a film-shaped electroluminescence device so as to impart an optical function to the adhesive sheet. On the other hand, an optical catalyst layer is preferably formed on the substrate surface to enhance the contamination resistance of the substrate surface.

The substrate may be composed of two or more different layers. For example, the substrate preferably comprises a moistureproof film. The substrate can comprises, for example, a base layer provided on the adhesive layer side, and a layer made of a moistureproof film disposed at the outermost surface side. As the base layer, a material having good adhesion to the adhesive layer (e.g. polyvinyl chloride, polymethyl methacrylate, etc.) is preferably used. As the moistureproof film, a film containing a fluoropolymer is preferably used. Consequently, it is possible to prevent water from penetrating the metal surface such as plated surface from the outside, thereby making it possible to prevent a reduction in adhesive strength with a lapse of time. The thickness of the moistureproof film is usually from 5 to 200 μm, and preferably from 10 to 100 μm. When the thickness of the moistureproof film is too small, the moisture resistance is lowered. On the other hand, when the thickness is too large, there is a fear that the flexibility and pliability of the whole adhesive sheet are lowered and it becomes difficult to perform an applying operation.

Specific examples of the film containing a fluoropolymer include "(trade name) DX Film" manufactured by Denki Kagaku Kogyo Co., Ltd., "(trade name) Tedler Film" manufactured by Du Pont Co. and "(trade name) Aflex Film" manufactured by Asahi Garasu Kogyo Co., Ltd.

For example, the "(trade name) DX Film" is a two-layer film comprising a lower layer containing a large amount of polymethyl methacrylate and an upper layer containing a large amount of polyvinylidene fluoride. This film can be used as it is as a substrate, thereby providing an adhesive layer on the under layer side. Furthermore, a base layer containing polyvinyl chloride can also be laminated on the surface of the lower layer of the "(trade name) DX Film", thereby using as a substrate.

As the substrate of the decorative sheet with metal gloss, comprising a metal layer (hereinafter also referred to as a metallic sheet), a multi-layer film comprising a light transmitting coated layer, and a bonding layer for bonding the coated layer with the metal layer, said bonding layer comprising (1) a first resin layer provided in closely contact with the coated layer (also referred to as a "barrier layer") and (2) a second resin layer located between the barrier layer and metal layer (also referred to as a "stabilized layer"). Since such a form can provide a metallic sheet wherein the adhesion to the coated layer is effectively improved and fogging (deterioration or loss of metal gloss due to shrinkage and expansion of the metal layer) of the metal layer is improved, because the bonding layer for bonding the metal layer with the coated layer. As the coated layer, for example, a vinyl chloride resin can be used. The term "vinyl chloride resin" used herein refers to a vinyl chloride homopolymer, and a resin made of a copolymer containing a vinyl chloride monomer unit. The details of the metallic sheet as preferred aspect of the present invention will be described hereinafter.

The substrate made of a multi-layer film can be formed, for example, by coating a coating solution containing a material, which is changed into a second layer, on a first layer, thereby providing a layer made of the coated film in closely contact with the first layer. It can also be made by coextrusion of materials for each layer. Furthermore, separately prepared layers may also be laminated each other via an adhesive for lamination.

The whole thickness of the substrate is usually from 5 to 500 μm, and preferably from 10 to 300 μm. When the thickness of the whole substrate is too small, there is a fear that mechanical strength of the adhesive sheet is lowered and the durability is lowered. On the other hand, when the thickness is too large, there is a fear that the flexibility and pliability of the whole adhesive sheet are lowered and it becomes difficult to perform an applying operation. The adherend surface of the adhesive layer is usually protected with a liner. The liner is usually formed from a paper, a plastic film, or a film obtained by laminating both of them.

Metallic Sheet

In the metallic sheet according to the preferred aspect of the present invention, a first resin layer of a bonding layer comprises a saturated polyester or an aminoethylated is resin. Consequently, the adhesion with an adhesive layer, particularly an adhesive layer comprising a vinyl chloride resin, is improved. On the other hand, a second resin layer comprises (i) a polyester having a siloxane bond in the molecule or (ii) a polyurethane resin containing a polyester unit having a siloxane bond in the molecule. Consequently, fogging (whitening) of the metal layer under high-temperature environment can be prevented. The adhesion between the first resin layer and second resin layer is also good.

That is, according to the present invention, there can be provided a decorative sheet which can use a film comprising a vinyl chloride resin as a coated layer, and which does not cause peeling between the coated layer, bonding layer and metal layer in use containing high-temperature environment) and does not cause fogging of the metal layer (also corrosion of the metal layer as a matter of course). To effectively enhance the adhesion between these layers, the first and second resin layers of the bonding layer are preferably formed by a coating method.

Bonding Layer

A first layer of the bonding layer comprises the same resin as that described above, and also serves as a barrier layer for preventing components of a plasticizer and various stabilizers of the vinyl chloride resin, which inhibit the adhesion with the metal layer, from transferring to the interface between the second layer and metal layer, in addition to a function as an adhesive layer for a second layer of the bonding layer and a coated layer.

In the decorative sheet of the present invention, the metal layer is usually observed through both of the coated layer and bonding layer. In this case, the light transmittance is also required. Accordingly, the light transmittance of the first layer is usually not less than 40%, preferably not less than 60%, and particularly not less than 70%. The term "light transmittance" used in the present specification means a light transmittance measured by using an ultraviolet/visible light spectrophotometer "U best V-560" manufactured by Nippon Bunko Co., Ltd. and light of 550 nm.

The resin of the first layer is preferably a saturated polyester resin, an aminated ethyl resin, or a mixture thereof. The saturated polyester resin is preferably a linear polyester and a polyester having a glass transition temperature (Tg) of not less than 50° C. is preferred. Regarding the saturated polyester resin, the effect as the adhesive resin can be enhanced by adding a crosslinking agent such as isocyanate compound, thereby to crosslink the resin. The content of the crosslinking agent is usually within a range from 1 to 20 parts by weight based on 100 parts by weight of the resin. Specific examples of the aminoethylated resin include "(trade name) Polymer (product No.) NK350" manufactured by Nippon Shokubai Co., Ltd., "(product No.) NK380" and "(product No.) NK307"

The molecular weight of the resin of the first layer is not specifically limited as far as the effect of the present invention is not adversely affected, and is usually within a range from 1,000 to 1,000,000 in terms of a weight-average molecular weight.

The thickness of the first layer is usually within a range from 0.5 to 15 μm, and preferably from 1 to 10 μm. When the thickness of the first layer is too small, the barrier effect is likely to be lowered. On the other hand, when the thickness is too large, the adhesion between the coated layer and bonding layer is likely to become poor and the flexibility of the whole sheet is likely to be inhibited.

The first layer is preferably formed by a normal coating method. As the coating means, for example, a publicly known coater such as knife coater, roll coater and bar coater can be used. When the coating solution contains a solvent, the drying is usually performed at a temperature within a range from 60 to 180° C. for tens of seconds to several minutes. As far as the effect of the present invention is not adversely affected, a conventionally known additive can be added to the coating solution. Suitable additive includes, for example, viscosity adjustors, defoamers, leveling agents, ultraviolet absorbers, antioxidants, pigments and mildew-proofing agents.

The second layer is a layer which is superior in adhesion with the metal layer and has high heat resistance, and which serves so that the metal layer provided in closely contact with the layer does not cause fogging (whitening) even under the high-temperature environment, or even if the sheet is heated. When the light transmittance is required similar to the first layer, the light transmittance of the second layer is usually not less than 40%, preferably not less than 60%, and particularly not less than 70%.

The resin of the second layer is preferably (i) a polyester having a siloxane bond in the molecule, (ii) a polyurethane resin containing a polyester unit having a siloxane bond in the molecule, or (iii) a mixture thereof. Furthermore, the resin (i) and the resin (ii) are sometimes referred to a "silicon-modified polyester" and a "silicon-modified polyurethane", respectively. The molecular weight of the second layer is not specifically limited as far as the effect of the present invention is not adversely affected, and is usually within a range from 1,000 to 1,000,000. The details of these resins will be described hereinafter.

The thickness of the second layer of the resin is usually within a range from 0.5 to 15 $\mu$m, and preferably from 1 to 10 $\mu$m. When the thickness of the second layer is too small, the fogging inhibition effect is likely to be lowered. When the thickness is too large, the flexibility of the whole sheet is likely to be inhibited. Also the second layer is preferably formed by a coating method. As the coating means, the same coater as that in case of the first layer can be used. Also the drying conditions are the same as those in case of the first layer. As far as the effect of the present invention is not adversely affected, a conventionally known additive can also be added to the coating solution of the second layer.

The resin used preferably in the second layer, such as polyester resin described above will be described. The term "siloxane bond" means a —Si—O— unit. The term "polyester having a siloxarie unit in the molecule" means a polyester having at least one unit in the molecule, which is obtained by reacting a polyol with dibasic acid. The term "polyurethane resin containing a polyester unit having a siloxane bond in the molecule" means a resin prepared by reacting the polyol and polyester as described above and an isocyanate compound. If at least one siloxane unit is contained in the polymer constituting the resin, fogging as described above can be effectively prevented. When the number of repeating units is large, there is a fear that the reactivity with a crosslinking agent described hereinafter is lowered and the heat resistance can not be effectively enhanced. The number of repeating units of the siloxane bond is preferably within a range from 2 to 1,000.

The polyol used in the preparation of the polyester having a siloxane bond in the molecule can be prepared, for example, by the reaction between a raw polyol having a siloxane bond in the molecule and a polybasic acid such as dicarboxylic acid.

As the polyol, for example, those described in Japanese Unexamined Patent Publication (Kokai) No. 5-97868 can be used. This polyol is a polyol which has a siloxane bond in the molecule and has a diol or triol at the terminal end. There can also be used a polysiloxane having two or more alkoxy groups linked to a silicon atom, which can be easily decomposed in the presence of water. Since such a polyol has a siloxane bond in the molecule, the resulting polyurethane is superior in heat resistance and oxidation resistance, and is superior in adhesion with the metal layer.

Other functional groups such as polyester, polyether, carboxyl, phenyl, methyl, acrylic and amino groups may be introduced into the above polyol. A polyol having a benzene ring described in Japanese Unexamined Patent Publication (Kokai) No. 4-414193, for example, 1,3-bis(p-hydroxybenzyl)-1,1,3,3-tetramethyldisiloxane and a derivative thereof is particularly superior in heat resistance.

The isocyanate suited for use in the preparation of the polyurethane resin includes, for example, aromatic, aromatic-aliphatic, aliphatic and alicyclic isocyanates such as diphenylmethane-4.4'-diisocyanate (MDI), tolylene diisocyanate (TDI), hexamethylene diisocyanate, isophorone diisocyanate, dicyclohexylmethane-4.4'-diisocyanate, naphthylene diisocyanate (NDI), and their derivatives whose terminal is blocked. Trimers of these isocyanates are superior in heat resistance. Among them, trimers such as isophorone diisocyanate (IPDI) and hexamethylene diisocyanate (HDI) are particularly preferred because they are superior in heat resistance and can form a polyurethane which does not cause yellow discoloration. These isocyanate trimers can also be used as a crosslinking agent. When the above polyester or polyurethane resin is crosslinked, the amount of the crosslinking agent is usually within a range from 1 to 100 parts by weight, based on 100 parts by weight of the resin.

The molecular weight of the polymer constituting the resin of the second layer is not specifically limited as far as the effect of the present invention is not adversely affected, and is usually within a range from 1,000 to 1,000,000.

Coated Layer

The coated layer is obtained, for example, by forming a material comprising a vinyl chloride resin into a film. The forming method which can be used includes, for example, a film forming method such as calendering method, casting method and extrusion method.

Specifically, a coating solution containing a vinyl chloride resin, such as sol is coated on a substrate, and then dried to form a film. As the substrate, for example, a plastic film such as PET film having the surface subjected to a release treatment can be used.

When a colorless and transparent film (light transmittance is usually not less than 70%) is used as the vinyl chloride film, the silver-tone appearance with metal gloss is obtained. When a light-transmittive colored film (light transmittance is usually not less than 40%) is used, the metallic appearance with an optional color is obtained. It is also possible to provide embossing or printing on the film surface of the coated layer.

The thickness of the coated layer is not specifically limited, but us usually within a range from 10 to 300 $\mu$m, and preferably from 20 to 300 $\mu$m.

Method for Production of a Metallic Sheet

The metallic sheet can be produced, for example, by the following manner.

First, a first layer of a bonding layer is laminated on the back surface of a coated layer. The first layer is formed by coating a coating composition containing the above resin and then solidifying. As a solidifying means, for example, drying, curing and cooling (in case that a coating composition is a melt) can be used. As a coating means, a coating means such as roll, knife, bar and die can be used. The second layer is also formed by coating a coating composition containing the second resin and then solidifying in the same manner as that in case of the first layer.

As far as the effect of the present invention is not adversely affected, conventionally known additives can be added to the coating composition and/or second layers. Suitable additive includes, for example, viscosity adjustors, defoamers, leveling agents, ultraviolet absorbers, antioxidants and Pigments.

Then, a metal layer is formed on the surface of the bonding layer to form a decorative sheet of the present invention. To form the metal layer, a thin film forming means such as deposition and sputtering can be used. Explaining about the deposition, the metal layer can be formed, for example, by vacuum deposition of the metal such as aluminum, tin and chromium. The thickness of the metal layer is usually within a range from 50 to 5,000 Å taking a mechanical strength into consideration.

Finally, an adhesive layer is laminated on the surface of the metal layer, thereby to complete a metallic sheet of the present invention. The adhesive layer is a layer made of the adhesive composition of the present invention. The adhesive layer may be crosslinked or non-crosslinked as far as the effect of the present invention not adversely affected. A tackifier and adhesive elastic microspheres can also be contained. The thickness of the adhesive layer is usually within a range from 10 to 100 $\mu$m, and preferably from 15 to 80 $\mu$m.

The adhesive layer can be formed, for example, by coating a coating composition containing an adhesive composition in a release paper (including a polymer liner), solidifying the coating composition to form a laminate, and then laminating the laminate on the back surface of the metal layer. The coating composition may be solidified after directly coating on the metal layer.

Alternatively, an aromatic carboxylic acid may be added to a second layer of the bonding layer ("stabilized layer" to be contacted with the metal layer). For example, when the metal layer is formed upon vacuum deposition of tin and the like and is discontinuous (islands-like) layer, intrusion of corrosive substances can be caused from a side of the substrate, in addition to a side of the adhesive layer. Accordingly, in such a case, the addition of the aromatic carboxylic acid to the bonding layer is suitable for the purpose of increasing a corrosion inhibiting function. Generally, the content of the aromatic carboxylic acid is in the range of 1 to 10% by weight with regard to a whole of the bonding layer or a whole of the second layer, if the bonding layer has a two layered structure.

EXAMPLE

The following examples are illustrative of the adhesive composition and adhesive sheet according to the present invention, but the present invention is not limited by these examples.

Example 1

First, a carboxylic acid-free adhesive film was prepared. 80 Parts by weight of butyl acrylate, 10 parts by weight of isobutyl acrylate and 10 parts by weight of 2-hydroxylethyl acrylate were prepared as a monomer component and, at the same time, 0.01 parts by weight of benzyl peroxide was prepared as a polymerization initiator. These raw materials were dissolved in ethyl acetate and the mixture was reacted at a reflux temperature of ethyl acetate for 6 hours to obtain a carbon-free adhesive polymer.

To an ethyl acetate solution (concentration of nonvolatile content: 30% by weight) containing 100 parts by weight of the above adhesive polymer (nonvolatile content), 0.5 parts by weight of isocyanate [product No. D-90, manufactured by Soken Kagaku Co., Ltd.] as a curing agent and 1.5 parts by weight of salicylic acid as an aromatic carboxylic acid were added and the mixture was stirred until all materials are uniformly mixed to prepare a liquid adhesive composition.

This liquid composition was coated on the surface of a metal deposited layer formed on a substrate described hereinafter using a knife coater, and then dried at 100° C. for 3 minutes, thereby making an adhesive sheet (metallic sheet) having an adhesive layer made of an adhesive composition of this example. The thickness of the adhesive layer after drying was 25 $\mu$m. The adhesive layer had suitable tack in the same manner as that in case of the adhesive layer of a normal adhesive sheet.

In all examples and comparative examples, the substrate having a metal deposited layer on one principal surface was prepared by the following manner.

(1) First, a coating solution containing PVC (polyvinyl chloride resin) was coated on a PFT (polyethylene terephthalate) film subjected to a release treatment to form a coated layer having a thickness of 50 $\mu$m.

(2) A coating solution containing Biron 24SS (manufactured by Toyobo Co., Ltd.) and Colonate HX (manufactured by Nippon Polyurethane Co., Ltd.) in a ratio (weight ratio) of 100:3 was coated on the coated layer, and then dried at 160° C. for 3 minutes to provide a barrier layer having a thickness of 5 $\mu$m.

(3) A coating solution containing silicone-modified polyester (trade name: Bisiron Resin, product No.: UD-460) manufactured by Bayer Gosei Silicon Co., Ltd. and isophorone diisocyanate (product No.: Z4370, manufactured by Sumitomo Bayer Japan Co., Ltd.) in a ratio (weight ratio) of 100:75 was coated on the barrier layer, and then dried at 180° C. for 3 minutes to form a stabilized layer having a thickness of 2 $\mu$m, thereby obtaining a substrate wherein the coated layer, the barrier layer and the stabilized layer are laminated each other in this order.

On the stabilized layer of the substrate thus obtained, a deposited layer made of aluminum was formed in a film thickness of 500 Å by the vacuum deposition method to obtain a substrate having a metal deposited layer.

1. Corrosion Resistance of Metal Layer

The adhesive sheet of this example was cut into pieces having a planar size of 2.5 cm×6 cm, and each of which was laminated on a galvanized iron plate (substrate) to form a laminate. This laminate was dipped in a sodium chloride solution having a concentration of 5% by weight at a normal temperature (about 25° C.) for 15 days and the degree of corrosion of the metal layer was examined through a light emitting substrate. As a result, the corroded area ratio (percentage of the area of the metal layer lost by corrosion to the total area of the metal layer) was 0% and any corrosion of the metal layer was not recognized.

2. Adhesion Between Metal Layer and Substrate

In the laminate obtained in the same manner as that described above, the adhesion between the metal layer and substrate (bonding layer) was measured. As a result, it showed an adhesive strength larger than 1.5 kg/25 mm even after aging under a heating cycle at −30 to 80° C. for 30 days. It showed an adhesive strength larger than 1.5 kg/25 mm even after aging at 100° C. for 30 days. As is apparent from these results, the adhesion between the metal layer and substrate is good.

3. Fogging Test

The laminate obtained in the same manner as that described above was heated in an oven at 160° C. for 30 minutes and the appearance of the metal layer was visually observed. As a result, any fogging (formation of the portion which seemed to be white) was not recognized.

4. Adhesion Test

The adhesive sheet of this example was cut into pieces having a size of 150 mm×25 mm, and each of which was applied to an adherend (galvanized steel plate) by pressing under the conditions of 20° C.×65% RH in the same manner as that in case of a normal adhesive sheet, and the resultant was used as a test piece. This test piece was allowed to stand under the same conditions (20° C., 65% RH) for 24 hours, and then the adhesive strength (peel strength) was measured under the measuring conditions of a peel rate of 300 mm/min. and a peel angle of 90 degree. As a result, the peel strength of not less than 1.0 kg/25 mm was obtained, which show good adhesion performance.

Example 2

In the same manner as that described in Example 1, except for using 10.0 parts by weight of orthomethylbenzoic acid as the aromatic carboxylic acid, an adhesive composition and an adhesive sheet (metallic sheet) of the present invention were made. The corroded area ratio of the metal layer, which was measured in the same manner as that described in Example 1, was 8%. As a result, it was judged that the appearance with metallic luster can be sufficiently maintained and the corrosion resistance is good. The results of the adhesion between the metal layer and substrate, and the fogging test were good, similar to Example 1. The adhesion performance was also good, similar to Example 1.

Example 3

In the same manner as that described in Example 1, except for using 10.0 parts by weight of methahydroxybenzoic acid as the aromatic carboxylic acid, an adhesive composition and an adhesive sheet (metallic sheet) of the present invention were made. The corroded area ratio of the metal layer, which was measured in the same manner as that described in Example 1, was 2%. As a result, it was judged that the appearance with metallic luster can be sufficiently maintained and the corrosion resistance is good. The results of the adhesion between the metal layer and substrate, and the fogging test were good, similar to Example 1. The adhesion performance was also good, similar to Example 1.

Example 4

In the same manner as that described in Example 1, except for using a tin-deposited layer as the metal layer and additionally adding an aromatic carboxylic acid (salicylic acid) to the stabilized layer, an adhesive sheet (metallic sheet) of the present invention was made. The corroded area ratio of the metal layer, which was measured in the same manner as that described in Example 1, was 1%. As a result, it was judged that the appearance with metallic luster can be sufficiently maintained and the corrosion resistance is good. The content of salicylic acid in the stabilized layer was 4% by weight with regard to a total of the stabilized layer (solid content). Contrary to this, when salicylic acid was added to the stabilized layer, but it was not added to the adhesive layer, the corroded area ratio of the metal layer was measured to be 15%.

Comparative Example 1

In the same manner as that described in Example 1, except for using no aromatic carboxylic acid, an adhesive composition and an adhesive sheet (metallic sheet) of the present invention were made. The corroded area ratio of the metal layer, which was measured in the same manner as that described in Example 1, was 100% and any appearance with metal luster was lost. The adhesion performance was also good, similar to Example 1.

Comparative Example 2

In the same manner as that described in Example 1, except for using a polymer having no hydroxyl group in the molecule (isooctyl acrylate:ethyl acrylate=60:40) as the adhesive polymer, an adhesive composition and an adhesive sheet (metallic sheet) of the present invention were made. The corroded area ratio of the metal layer, which was measured in the same manner as that described in Example 1, was 100% and any appearance with metal luster was lost.

What is claimed is:

1. An adhesive sheet comprising a substrate, a metal layer provided on one principal surface of said substrate, and an adhesive layer provided in closely contact with said metal layer, wherein said adhesive layer comprises (i) a hydroxyl group-containing adhesive polymer, and (ii) an aromatic carboxylic acid compound, wherein said polymer comprises a sufficiently low amount of monomer units containing a carboxylic group that the adhesive composition is Corrosion Resistant.

2. The adhesive sheet of claim 1, wherein less than 10% of the weight of total polymer of the adhesive is provided by monomer units containing a carboxylic group.

3. The adhesive sheet of claim 1, wherein less than 5% of the weight of total polymer of the adhesive is provided by monomer units containing a carboxylic group.

4. The adhesive sheet of claim 1, wherein said polymer of the adhesive is substantially free of carboxylic groups.

5. The adhesive sheet of claim 1, wherein not less than 1% of the weight of the total polymer of the adhesive is provided by monomer units having a hydrogel group.

6. The adhesive sheet of claim 1, wherein not less than 5% of the weight of the total polymer of the adhesive is provided by monomer units having a hydrogel group.

7. The adhesive sheet of claim 1, wherein said aromatic carboxylic acid compound of the adhesive is selected from benzoic acid, and salicylic acid, methylbenzoic acid, phthalic acid and aminobenzoic acid.

8. The adhesive of claim 1, wherein said polymer of the adhesive comprises not less than 50% by weight of the total adhesive composition.

9. The adhesive sheet of claim 1, wherein said aromatic carboxylic acid compound of the adhesive comprises 0.1–25 parts by weight based on 100 parts by weight of the polymer.

10. The adhesive sheet of claim 1, wherein the adhesive further comprises a curing agent.

* * * * *

UNITED STATES PATENT AND TRADEMARK OFFICE
CERTIFICATE OF CORRECTION

PATENT NO.     : 6,627,688 B1
DATED          : September 30, 2003
INVENTOR(S)    : Takeda, Yasuyuki It is certified that error appears in the above-identified patent and that said Letters Patent is hereby corrected as shown below:

Column 3,
Line 5, delete "invention o an" and insert in place thereof -- invention, an --.
Line 42, delete "closely" and insert in place thereof -- close --.

Column 5,
Line 2, delete "closely" and insert in place thereof -- close --.

Column 8,
Line 59, delete "comprises" and insert in place thereof -- comprise --.

Column 9,
Lines 29 and 49, delete "closely" and insert in place thereof -- close --.
Line 51, after "laminated" insert -- to --.

Column 11,
Line 49, delete "siloxarie" and insert in place thereof -- siloxane --.

Column 12,
Line 62, delete "us" and insert in place thereof -- is --.

Column 13,
Line 16, delete "Pigments" and insert in place thereof -- pigments --.
Line 32, after "invention" insert -- is --.
Line 58, delete "EXAMPLE" and insert in place thereof -- EXAMPLES --.

UNITED STATES PATENT AND TRADEMARK OFFICE
CERTIFICATE OF CORRECTION

PATENT NO. : 6,627,688 B1
DATED : September 30, 2003
INVENTOR(S) : Takeda, Yasuyuki It is certified that error appears in the above-identified patent and that said Letters Patent is hereby corrected as shown below:

Column 16,
Line 32, delete "closely" and insert in place thereof -- close --.
Lines 49 and 52, delete "hydrogel" and insert in place thereof -- hydroxyl --.
Line 55, delete "acid, and salicylic" and insert in place thereof -- acid, salicylic --.

Signed and Sealed this

Twenty-second Day of March, 2005

JON W. DUDAS
*Director of the United States Patent and Trademark Office*